(12) United States Patent
Ishizaki et al.

(10) Patent No.: US 6,709,321 B2
(45) Date of Patent: Mar. 23, 2004

(54) PROCESSING JIG

(75) Inventors: Kazuo Ishizaki, Tokyo (JP); Makoto Hasegawa, Tokyo (JP)

(73) Assignee: TDK Corporation, Tokyo (JP)

( * ) Notice: Subject to any disclaimer, the term of this patent is extended or adjusted under 35 U.S.C. 154(b) by 602 days.

(21) Appl. No.: 09/733,918

(22) Filed: Dec. 12, 2000

(65) Prior Publication Data

US 2001/0041319 A1 Nov. 15, 2001

(30) Foreign Application Priority Data

Jan. 13, 2000 (JP) ........................................ 2000-004137

(51) Int. Cl.⁷ ............................................... B24B 41/06
(52) U.S. Cl. ............................... 451/364; 451/55; 451/5
(58) Field of Search ........................... 451/1, 5, 11, 28, 451/55, 114, 364, 387, 390, 405; 269/73, 246; 29/603.16, 603.12

(56) References Cited

U.S. PATENT DOCUMENTS

| 4,914,868 | A | | 4/1990 | Church et al. |
| 5,406,694 | A | | 4/1995 | Ruiz |
| 5,525,091 | A | | 6/1996 | Lam et al. |
| 5,607,340 | A | | 3/1997 | Lackey et al. |
| 5,620,356 | A | | 4/1997 | Lackey et al. |
| 5,624,298 | A | * | 4/1997 | Yumoto ........................ 451/28 |
| 6,174,218 | B1 | * | 1/2001 | Church et al. ................. 451/5 |
| 6,447,367 | B1 | * | 9/2002 | Kozu et al. .................... 451/5 |
| 6,513,229 | B1 | * | 2/2003 | Sasaki et al. ............. 29/603.19 |

FOREIGN PATENT DOCUMENTS

| JP | A 2-95572 | 4/1990 | |
| JP | 3-245966 | 11/1991 | |
| JP | 3-245967 | 11/1991 | |
| JP | 08235530 A | * 9/1996 | ............ G11B/5/31 |
| JP | 10-146758 | 6/1998 | |

* cited by examiner

Primary Examiner—Joseph J. Hail, III
Assistant Examiner—David B. Thomas
(74) Attorney, Agent, or Firm—Oliff & Berridge, PLC (57) ABSTRACT

A jig comprises: a main body; a retainer for retaining a block in which at least one row of sections to be sliders is aligned; a middle load application section coupled to a portion of the retainer located in the middle of the length thereof; end load application sections coupled to portions of the retainer near ends of the length thereof; middle couplers located between the middle load application section and each of the end load application sections, respectively, for coupling the main body to the retainer; and end couplers for coupling the main body to the ends of the length of the retainer. The length between the middle of the retainer and each of the ends thereof is greater than the length between the middle of the retainer and each of the end load application sections.

10 Claims, 11 Drawing Sheets

PROCESSING JIG

BACKGROUND OF THE INVENTION

1. Field of the Invention

The present invention relates to a processing jig for holding an object processed by a processing apparatus.

2. Description of the Related Art

A flying-type thin-film magnetic head used for a magnetic disk drive and so on is generally made up of a slider and a magnetic head element provided at the trailing edge of the slider. The slider generally comprises a rail whose surface functions as a medium facing surface (an air bearing surface) and a tapered section or a step near the end on the air inflow side. The rail flies slightly above the surface of a recording medium such as a magnetic disk by means of air flow from the tapered section or step.

A thin-film magnetic head element generally used is a composite element made up of layers of an induction-type electromagnetic transducer for writing and a magnetoresistive (MR) element for reading.

In general, such thin-film magnetic heads are formed through cutting a wafer in one direction in which sections to be sliders (hereinafter called slider sections) each including a thin-film magnetic head element are aligned in a plurality of rows. A bar-like magnetic head material (hereinafter called a bar) made up of a row of slider sections is thereby formed. Processing such as lapping is performed on a surface of the bar to be the medium facing surface (hereinafter called the medium facing surface for convenience). The bar is then separated into individual sliders.

In general, in order to stabilize the output characteristic of a thin-film magnetic head, it is important to maintain the distance between the magnetic pole of the head and the surface of a recording medium at an extremely small specific value. It is therefore required in magnetic head processing that the flatness of the medium facing surface of the head precisely fall on a specific value so as to stabilize a flying amount and that the throat height and the MR height of the head fall within specific ranges. The throat height is the length (height) of the magnetic pole of an induction-type electromagnetic transducer between an end thereof located in the medium facing surface and the other end. The MR height is the length (height) between an end of the MR element located in the medium facing surface and the other end.

There are several methods for lapping the medium facing surface so as to achieve desired values of the throat height and MR height of a thin-film magnetic head. A method generally used and achieving high precision is the method that utilizes a processing jig having functions described later and a lapping apparatus having the function of automatically lapping while applying an appropriate load to the jig and deforming the bar bonded to the jig.

The processing jig used in this method comprises a main body fixed to the lapping apparatus, a retainer that is long in one direction for retaining a bar, and a plurality of load application sections, coupled to the retainer, to each of which a load is applied for deforming the retainer. The shape of the retainer is a narrow and long beam that is bent with an application of external force. An external force being applied to the load application sections of the jig, the retainer is bent. The bending of the retainer causes bending of the bar held by the retainer.

A method of lapping a bar using the jig will now be described. In this method, the bar is fixed to the retainer of the jig with an adhesive and the like so that the surface of the bar to be lapped faces outside.

Next, the values of the throat height and MR height of each magnetic head element in the bar fixed to the jig are determined through an optical or electrical method. The deviation of the determined values from the target values, that is, the amounts of lapping required, are calculated.

Of the sections to be lapped corresponding to the magnetic head elements in the bar, a section that requires a greater amount of lapping than the other sections needs to be more lapped. Therefore, the bar is deformed by applying loads to the load application sections so that the surface to be lapped of the section is made convex. On the other hand, a section that requires a smaller amount of lapping than the other sections needs to be less lapped. Therefore, the bar is deformed by applying loads to the load application sections so that the surface to be lapped of the section is made concave. The bar is lapped by pressing the medium facing surface of the bar against a lapping plate rotating while the bar is deformed.

In such a manner, a series of operations is automatically repeated, including determining the throat height and the MR height of each magnetic head element, calculating the deviation of the determined values from the target values, that is, the amounts of lapping required, and lapping the bar while deforming the bar in accordance with the amounts of lapping required. Variations in the throat heights and the MR heights of the magnetic head elements are thereby modified. Finally, the throat heights and the MR heights of the magnetic head elements fall within a specific range.

A lapping apparatus for performing lapping of a bar as described above is disclosed in U.S. Pat. No. 5,620,356. A jig for lapping magnetic heads is disclosed in U.S. Pat. No. 5,607,340. A lapping control apparatus is disclosed in Published Unexamined Japanese Patent Application Heisei 2-95572 (1990) for controlling the throat height through observing the resistance of an MR element.

Another prior-art method of processing the medium facing surface of a bar and separating the bar is the method illustrated in FIG. 7 of U.S. Pat. No. 5,406,694. In this method a block having a specific length and including several rows of slider sections is separated from a wafer. This block is fixed to a specific jig by fixing a surface of the block opposite to the medium facing surface thereof to the jig. Processing is performed on the medium facing surface of the block fixed to the jig. The bar having received processing of the medium facing surface is then separated from the block.

When processing of the medium facing surface and separation of bars are performed through the use of the block as described above, the dimension (hereinafter called the height) of the block, that is, the object to be processed, measured in the direction orthogonal to the medium facing surface changes step by step.

In addition, to obtain more sliders (thin-film magnetic heads) from a circular-plate shaped wafer, it is possible to obtain from the wafer a plurality of types of blocks having different dimensions (hereinafter called lengths) measured in the direction in which slider sections are aligned.

When processing of the medium facing surfaces is performed through the use of the blocks having different heights and lengths as described above, it is required to utilize a jig capable of constantly deforming the medium facing surfaces of the blocks into desired shapes even though the blocks have different heights and lengths.

A prior-art jig designed for processing a bar could be used as a jig for processing the blocks as described above. However, the jig designed for processing a bar is designed to be capable of deforming the bar having specific height and length into a desired shape. Therefore, this jig is not capable of deforming each of blocks into a desired shape, if the objects to be processed are blocks having different heights and lengths, depending on the heights and lengths of the blocks. It is thus difficult to perform processing with precision.

OBJECT AND SUMMARY OF THE INVENTION

It is an object of the invention to provide a processing jig capable of processing each of a plurality of types of objects with accuracy, the objects having different heights or length, or different heights and length.

A processing jig of the invention is provided for selectively retaining each of a plurality of types of objects to be processed that have different heights or lengths, or different heights and lengths. The jig is fixed to a processing apparatus for processing the objects. The jig comprises: a main body to be fixed to the processing apparatus; a retainer that is long in one direction for retaining each of the objects; a middle load application section coupled to a portion of the retainer located in the middle of the length thereof, a load being applied to the section for deforming the retainer; two end load application sections coupled to portions of the retainer near ends of the length thereof, a load being applied to each of the sections for deforming the retainer; two middle couplers located between the middle load application section and each of the end load application sections, respectively, for coupling the main body to the retainer; and two end couplers for coupling the main body to the ends of the length of the retainer. Along the length of the retainer, a length between the middle of the retainer and each of the ends thereof is greater than a length between the middle of the retainer and each of the end load application sections.

According to the jig of the invention, along the length of the retainer, the length of the retainer between the middle of the retainer and each of the ends thereof is greater than the length of the retainer between the middle of the retainer and each of the end load application sections. As a result, the jig allows each of the objects to be processed to be deformed into a desired shape if the object has a length shorter than the distance between the two end load application sections, or even if the object has a length longer than this distance. When a plurality of types of objects having different heights are to be processed, it is not necessary that the retainer is capable of attaining deformation into a complicated shape. Instead, the retainer is preferably capable of attaining moderate deformation if necessary while basically maintaining the straightness. In the jig of the invention the length between the middle of the retainer and each of the ends thereof is greater than the length between the middle of the retainer and each of the end load application sections. It is thereby possible to moderately deform the long retainer.

According to the jig of the invention, along the length of the retainer, the length between the middle of the retainer and each of the middle couplers may be greater than three sevenths of the length between the middle of the retainer and each of the end load application sections.

According to the jig of the invention, along the length of the retainer, the length between the middle of the retainer and each of the middle couplers may be greater than a half of the length between the middle of the retainer and each of the end load application sections.

According to the jig of the invention, the retainer may include portions each of which is located between the middle of the length thereof and each of the middle couplers, each of these portions having a thickness increasing with increases in the distance from the middle of the length or each of the middle couplers.

According to the jig of the invention, the retainer may include portions each of which is located between each of the ends thereof and each of the middle couplers, each of these portions having a constant thickness.

According to the jig of the invention, each of the end couplers may include: a vertical portion extending in the vertical direction and having an end connected to the main body; a horizontal portion extending in the horizontal direction and having an end connected to one of the ends of the retainer; and a slanting portion extending in a slanting direction and connecting the other end of the vertical portion to the other end of the horizontal portion. In this case, the horizontal portion may have a thickness smaller than the thickness of the retainer.

According to the jig of the invention, a slit may be provided between the retainer and each of the end load application sections, the slit extending from a position closer to the middle of the length of the retainer toward a position closer to one of the ends of the retainer.

According to the jig of the invention, each of the middle couplers may have a length that falls within a range between 150% and 250% of the thickness of a portion of the retainer corresponding to each of the middle couplers.

According to the jig of the invention, each of the objects may be a thin-film magnetic head material made up of at least one row of sections to be sliders each of which includes a thin-film magnetic head element.

Other and further objects, features and advantages of the invention will appear more fully from the following description.

DETAILED DESCRIPTION OF THE PREFERRED EMBODIMENT

A preferred embodiment of the invention will now be described in detail with reference to the accompanying drawings.

Figure 4:
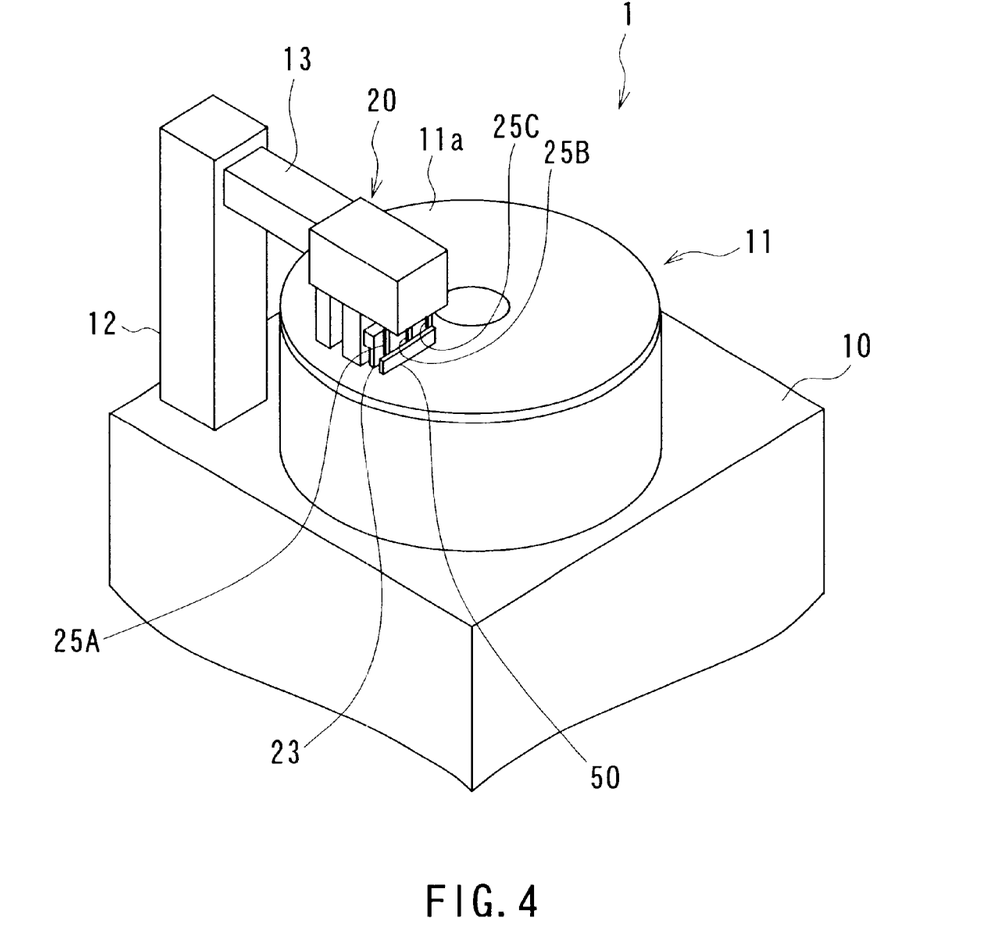
FIG. 4 is a perspective view of an example of a processing apparatus wherein the jig of the embodiment is used.

Reference is now made to FIG. 4 to describe an example of a processing apparatus wherein a processing jig of an embodiment of the invention is used. FIG. 4 is a schematic perspective view of the processing apparatus. The processing apparatus 1 is an apparatus for lapping a surface to be the medium facing surface (hereinafter called the medium facing surface for convenience) of a block-shaped thin-film magnetic head material (hereinafter called a block), the block including at least one row of sections to be sliders (hereinafter called slider sections), each of the slider sections including a thin-film magnetic head element. The processing apparatus 1 comprises: a table 10; a rotating lapping table 11 provided on the table 10; a strut 12 provided on the table 10 by the side of the rotating lapping table 11; and a material supporter 20 attached to the strut 12 through an arm 13. The rotating lapping table 11 has a lapping plate 11a to come to contact with the block.

The material supporter 20 comprises a jig retainer 23 and three load application rods 25A, 25B and 25C placed in front of the jig retainer 23 with specific spacing. A processing jig (simply called 'jig' in the following description) 50 of this embodiment is to be fixed to the jig retainer 23. As will be described later in detail, the jig 50 has three load application sections each of which is in the shape of a hole having an oblong cross section. Load application pins are provided at the lower ends of the load application rods 25A, 25B and 25C, respectively. Each of the load application pins has a head to be inserted to each of the load application sections (holes), the head having an oblong cross section. Each of the load application pins is driven by an actuator not shown in the vertical, horizontal (along the length of the jig 50) and rotational directions.

Figure 1:
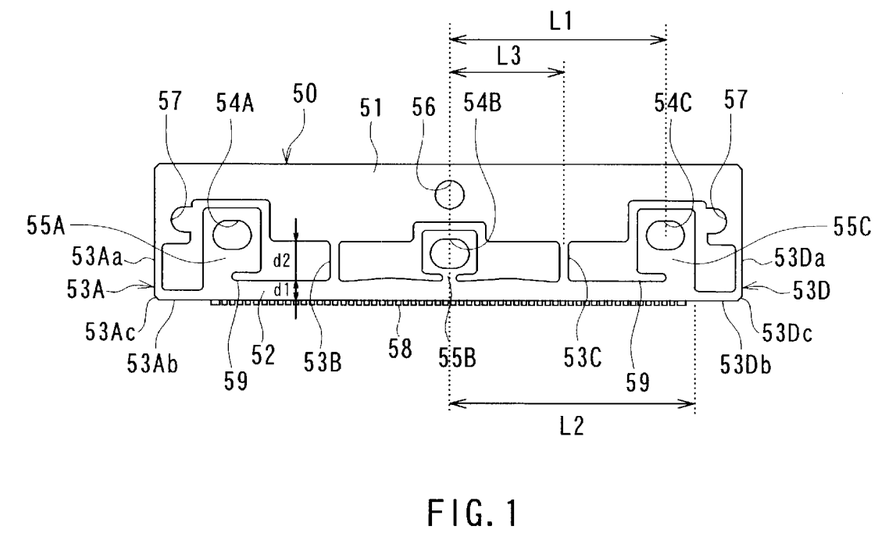
FIG. 1 is a front view of a jig of an embodiment of the invention.

Referring to FIG. 1, the structure of the jig of this embodiment will now be described. FIG. 1 is a front view of the jig. The jig 50 of the embodiment comprises: a main body 51 to be fixed to the processing apparatus 1 as shown in FIG. 4, for example; a retainer 52 that is long in one direction for retaining a block that is an object to be processed; a middle load application section 54B coupled to a portion of the retainer 52 located in the middle of the length thereof, a load being applied to the section 54B for deforming the retainer 52; two end load application sections 54A and 54C coupled to portions of the retainer 52 near ends of the length thereof, loads being applied to the sections 54A and 54C for deforming the retainer 52; arms 55A to 55C for coupling the retainer 52 to the load application sections 54A to 54C; two middle couplers 53B and 53C located between the middle load application section 54B and each of the end load application sections 54A and 54C, respectively, for coupling the main body 51 to the retainer 52; and two end couplers 53A and 53D for coupling the main body 51 to the ends of the retainer 52 located at the ends of the length thereof.

The main body 51 has a hole 56 for fixing located in the middle of the length of the main body 51 and in a position above the middle of the vertical height of the main body 51.

A bolt is inserted to the hole 56 for fixing the main body 51 to the jig fixing pin (not shown) provided in the jig retainer 23 of the processing apparatus 1. The jig 50 is fixed to the processing apparatus 1 at the only one point, that is, the point of the hole 56.

The main body 51 further has two engaging sections 57 in which the two guide pins (not shown) provided in the jig retainer 23 of the processing apparatus 1 are engaged. The engaging sections 57 are provided to prevent the jig 50 from rotating around the hole 56.

The shape of the retainer 52 is a beam that is long in one direction and bent with an application of external force. At the lower end of the retainer 52, a block fixing section 58 is provided to which a block is fixed. The block fixing section 58 has a plurality of grooves.

The jig 50 may be made of stainless steel or a ceramic such as zirconia ($ZrO_2$) or alumina ($Al_2O_3$).

In this embodiment, the load application sections 54A to 54C are oblong holes in cross section. The end load application sections 54A and 54C are located nearly in the middle of the vertical height of the main body 51. The middle load application section 54B is located lower than the middle of the vertical height of the main body 51.

Each of the middle couplers 53B and 53C has an end connected to the main body 51, and the other end connected to the retainer 52. Each of the couplers 53B and 53C is plate-shaped and flexible.

The end coupler 53A includes: a vertical portion 53Aa extending in the vertical direction and having an end connected to the main body 51; a horizontal portion 53Ab extending in the horizontal direction and having an end connected to an end of the retainer 52; and a slanting portion 53Ac extending in a slanting direction and connecting the other end of the vertical portion 53Aa to the other end of the horizontal portion 53Ab. Similarly, the end coupler 53D includes: a vertical portion 53Da extending in the vertical direction and having an end connected to the main body 51; a horizontal portion 53Db extending in the horizontal direction and having an end connected to an end of the retainer 52; and a slanting portion 53Dc extending in a slanting direction and connecting the other end of the vertical portion 53Da to the other end of the horizontal portion 53Db. Each of the end couplers 53A and 53D is plate-shaped and flexible. The length of each of the slanting portions 53Ac and 53Dc is sufficiently shorter than that of each of the vertical portions 53Aa and 53Da and the horizontal portions 53Ab and 53Db.

In this embodiment the length of the retainer 52 includes: length L1 between the middle of the retainer 52 and the end load application section 54A or 54C; and length L2 between the middle of the retainer 52 and an end thereof. Length L2 is greater than length L1.

The length of the retainer 52 includes length L3 between the middle of the retainer 52 and the middle coupler 53B or 53C. Length L3 is preferably greater than three sevenths of length L1 between the middle of the retainer 52 and the end load application section 54A or 54C. More preferably, length L3 is grater than a half of length L1.

The thickness of a portion of the retainer 52 between the middle of the length of the retainer 52 and the middle coupler 53B or 53C increases as the distance from the middle of the length of the retainer 52 or the middle coupler 53B or 53C increases.

The thickness of each of portions of the retainer 52 between each end of the length of the retainer 52 and each of the middle couplers 53B and 53C is constant.

The thickness of each of the horizontal portions 53Ab and 53Db of the end couplers 53A and 53D is smaller than the thickness of the retainer 52.

Each of the arms 55A and 55C provided between the retainer 52 and each of the end load application sections 54A and 54C has a slit 59 extending from a position closer to the middle of the length of the retainer 52 toward a position closer to an end of the retainer 52.

In this embodiment length d2 of the middle coupler 53B or 53C preferably falls within the range between 150% and 250% of thickness d1 of a portion of the retainer 52 corresponding to the middle coupler 53B or 53C.

Figure 2:
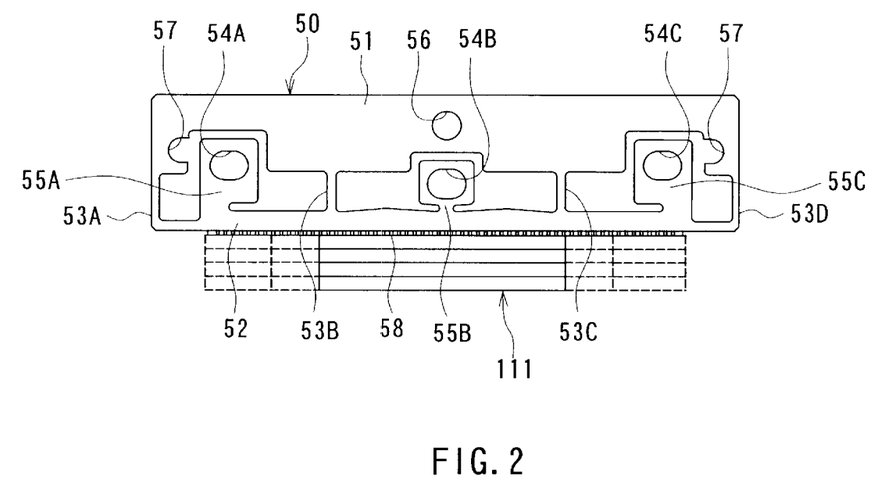
FIG. 2 is a front view of the jig of the embodiment in use.
Figure 3:
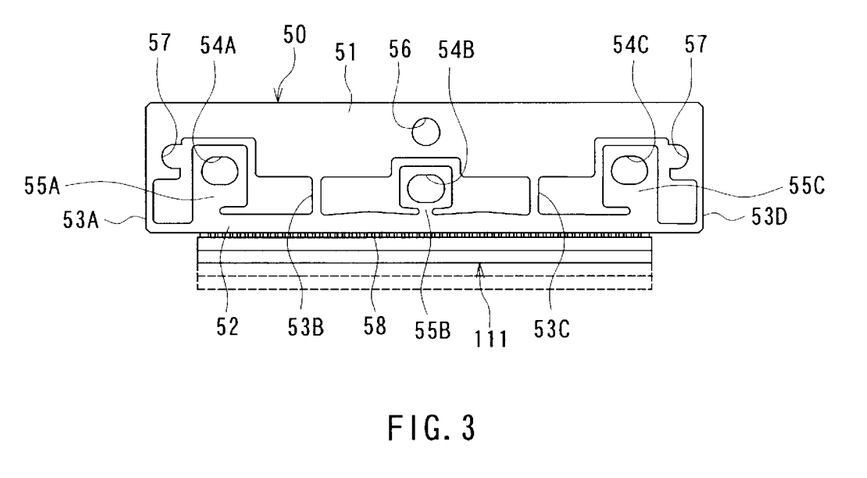
FIG. 3 is a front view of the jig of the embodiment in use.

Reference is now made to FIG. 2 and FIG. 3 to describe the function of the jig 50 of this embodiment. As shown, each of a plurality of types of blocks 111 is selectively fixed to the block fixing section 58 of the jig 50. The blocks 111 have different heights or length, or different heights and length. Each of the blocks 111 is fixed to the block fixing section 58 through bonding, for example, so that the medium facing surface of the block 111 faces outside (faces downward of FIG. 2 and FIG. 3). The height of each of the blocks 111 is the dimension thereof measured in the direction orthogonal to the medium facing surface (the vertical direction of FIG. 2 and FIG. 3). The length of each of the blocks 111 is the dimension thereof measured in the direction along which the slider sections are arranged therein (the horizontal direction of FIG. 2 and FIG. 3). FIG. 2 illustrates that the length of the blocks 111 may vary. FIG. 3 illustrates that the heights of the blocks 111 may vary.

The jig 50 retaining the block 111 is fixed to the processing apparatus 1 and placed such that the surface of the block 111 to be processed, that is, the medium facing surface comes to contact with the lapping plate 11a of the rotating lapping table 11. In this state, the load application pins of the processing apparatus 1 are driven in three directions including vertical, horizontal and rotational directions. Loads in the three directions are thereby applied to each of the load application sections 54A, 54B and 54C of the jig 50.

As thus described, the retainer 52, the block fixing section 58 and the block 111 are deformed by applying loads in various directions to the load application sections 54A, 54B and 54C of the jig 50. It is thereby possible to lap the medium facing surface of the block 111 while the throat heights and MR heights of the thin-film magnetic head elements in the block 111 are controlled so that the target values are obtained.

Figure 5:
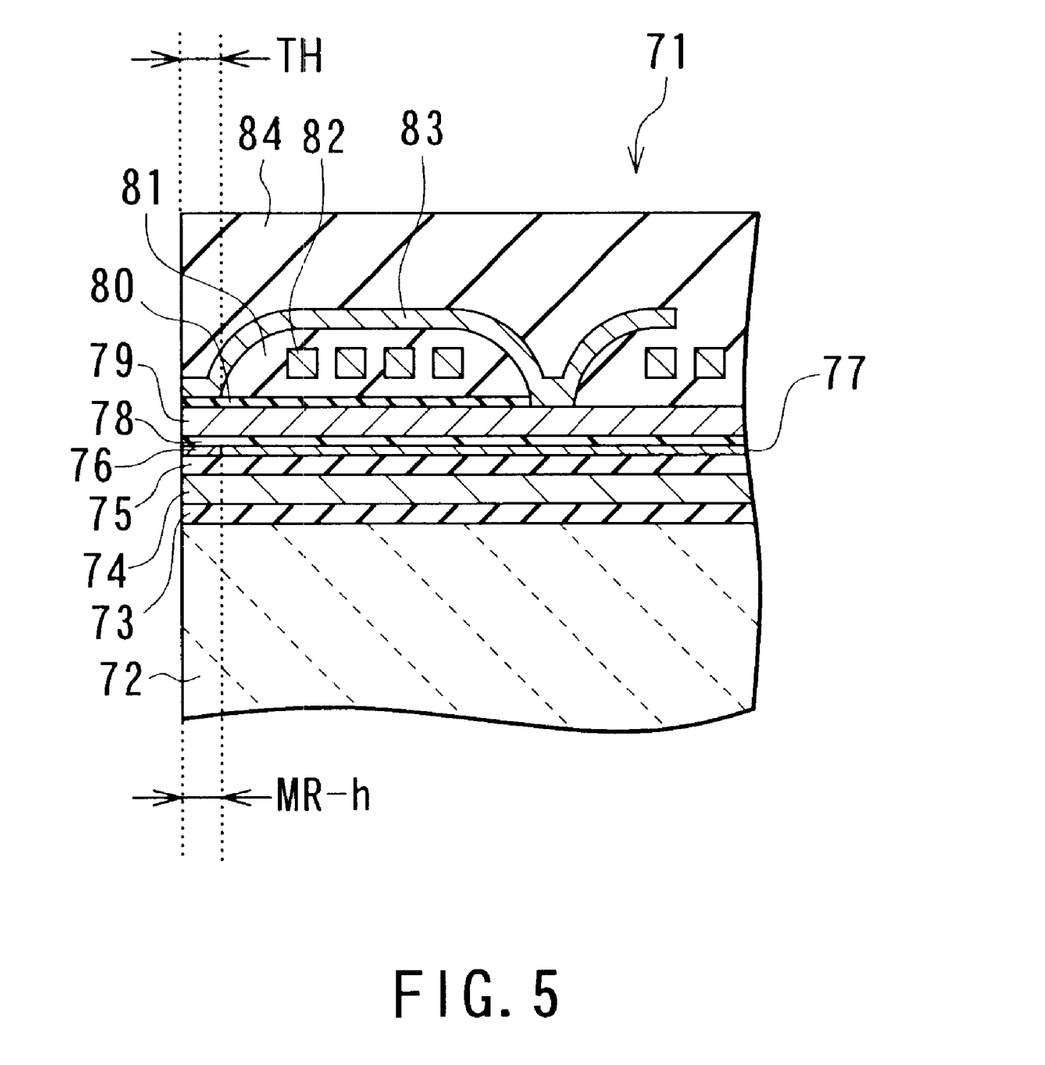
FIG. 5 is a cross-sectional view illustrating an example of the configuration of a thin-film magnetic head element.

Reference is now made to FIG. 5 to describe an example of the configuration of a thin-film magnetic head element. FIG. 5 is a cross section of a thin-film magnetic head element orthogonal to the medium facing surface thereof. This example is of a composite thin-film magnetic head element wherein an induction-type electromagnetic transducer for writing and an MR element for reading are stacked.

A thin-film magnetic head element 71 of this example comprises: a substrate 72 made of a ceramic such as aluminum oxide and titanium carbide ($Al_2O_3$—TiC); an insulating layer 73 made of an insulating material such as alumina ($Al_2O_3$) and formed on the substrate 72; a bottom shield layer 74 made of a magnetic material and formed on the insulating layer 73; a bottom shield gap film 75 made of an insulating material such as alumina and formed on the bottom shield layer 74; and an MR element 76 for reading formed on the bottom shield gap film 75 such that an end of the MR element 76 is located in the medium facing surface (the surface on the left side of FIG. 5). The head element 71 further comprises: a pair of electrode layers 77 formed on the bottom shield gap film 75 and electrically connected to the MR element 76; a top shield gap film 78 covering the bottom shield gap film 75, the MR element 76 and the electrode layers 77; and a top-shield-layer-cum-bottom-pole layer (hereinafter called a bottom pole layer) 79 made of a magnetic material and formed on the top shield gap film 78. The MR element 76 may be an element utilizing a magneto-sensitive film that exhibits magnetoresistivity, such as an anisotropic magnetoresistive (AMR) element, a giant magnetoresistive (GMR) element or a tunnel magnetoresistive (TMR) element.

The head element 71 further comprises: a recording gap layer 80 made of an insulating material such as alumina and formed on the bottom pole layer 79; a thin-film coil 82 formed on the gap layer 80 and surrounded by an insulating layer 81 made of a thermoset photoresist, for example; a top pole layer 83 made of a magnetic material and formed on the insulating layer 81; and a protection layer 84 made of an insulating material such as alumina and covering the top pole layer 83. Although not shown, a plurality of pad-shaped electrodes are formed on the top surface of the protection layer 84, the electrodes being connected to the MR element 76 and the coil 82.

The top pole layer 83 includes a pole portion that is a portion located on a side of the medium facing surface. The bottom pole layer 79 includes a pole portion that is a portion located on a side of the medium facing surface. These pole portions face each other, the recording gap layer 80 being located in between. The pole portion of the top pole layer 83 has a width equal to the recording track width. The top pole layer 83 has an end located farther from the medium facing surface, this end being connected and magnetically coupled to the bottom pole layer 79 through a contact hole formed in the recording gap layer 80.

The medium facing surface (the surface located on the left side of FIG. 5) of the magnetic head element 71 shown in FIG. 5 is the surface to be lapped by the processing apparatus 1 shown in FIG. 4. While lapping, the processing apparatus 1 performs control such that throat height TH and MR height MR-h of every magnetic head element 71 included in the block 111 fall within a certain limited tolerance. Such control may be performed through observing the resistance values of an electrical lapping guide (ELG) and the MR element 76 as disclosed in Published Unexamined Japanese Patent Application Heisei 2-95572 (1990), for example. The electrical lapping guides are, for example, formed on the substrate 72 when the magnetic head element 71 is formed, the lapping guides being placed at both ends of the length of the block 111 along which the slider sections are arranged.

Figure 6:
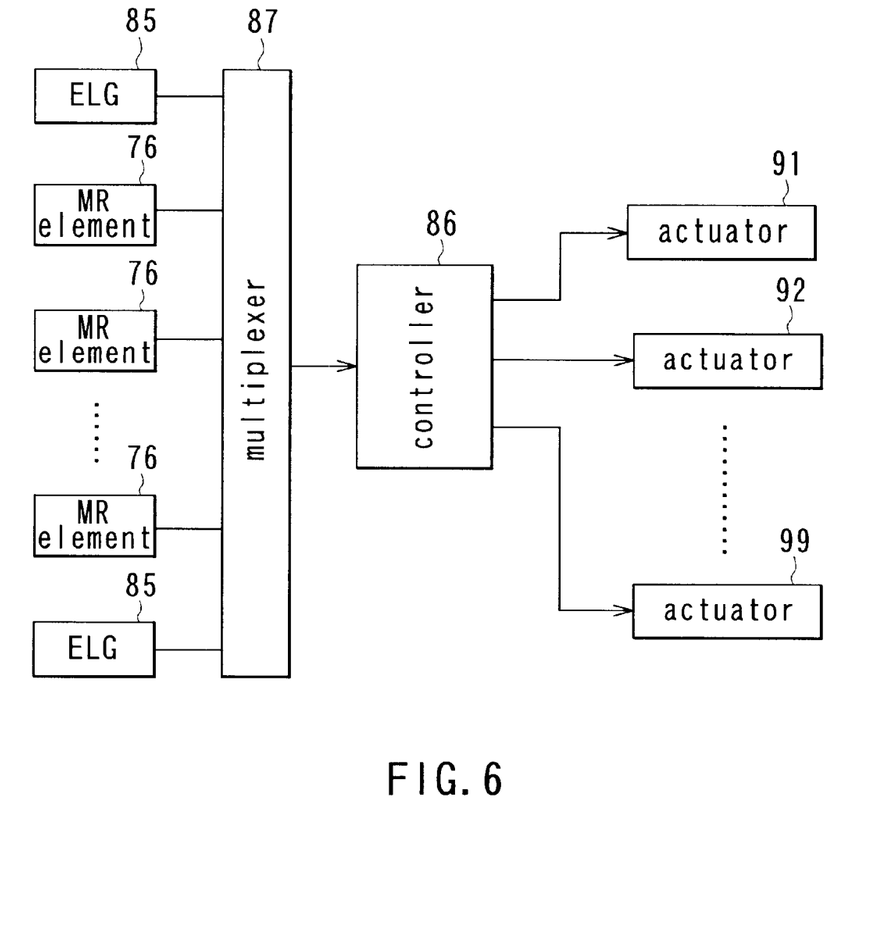
FIG. 6 is a block diagram showing an example of circuit configuration of the processing apparatus.

FIG. 6 is a block diagram showing an example of circuit configuration of a processing apparatus for controlling lapping by observing the resistance values of the electrical lapping guides and the MR elements as described above. The processing apparatus of this example comprises a controller 86 for controlling nine actuators 91 to 99 for applying loads in the three directions to the load application sections 54A, 54B and 54C of the jig 50 through observing the resistance values of electrical lapping guides (ELG) 85 and the MR elements 76 in the block 111; and a multiplexer 87, connected to the plurality of electrical lapping guides 85 and the MR elements 76 in the block 111 through a connector not shown, for selectively connecting one of the electrical lapping guides 85 and one of the MR elements 76 to the controller 86.

In the processing apparatus, the controller 86 controls the actuators 91 to 99 through the multiplexer 87 by observing the resistance values of the electrical lapping guides 85 and the MR elements 76 in the block 111. The controller 86 first performs coarse control by observing the resistance values of the electrical lapping guides 85. The controller 86 then performs control by observing the resistance values of the MR elements 76 so that throat height TH and MR height MR-h of every magnetic head element 71 fall within a certain limited tolerance.

Reference is now made to FIG. 7 to FIG. 13 to describe a series of steps of manufacturing sliders out of the block 111 that is the object to be processed of this embodiment.

Figure 7:
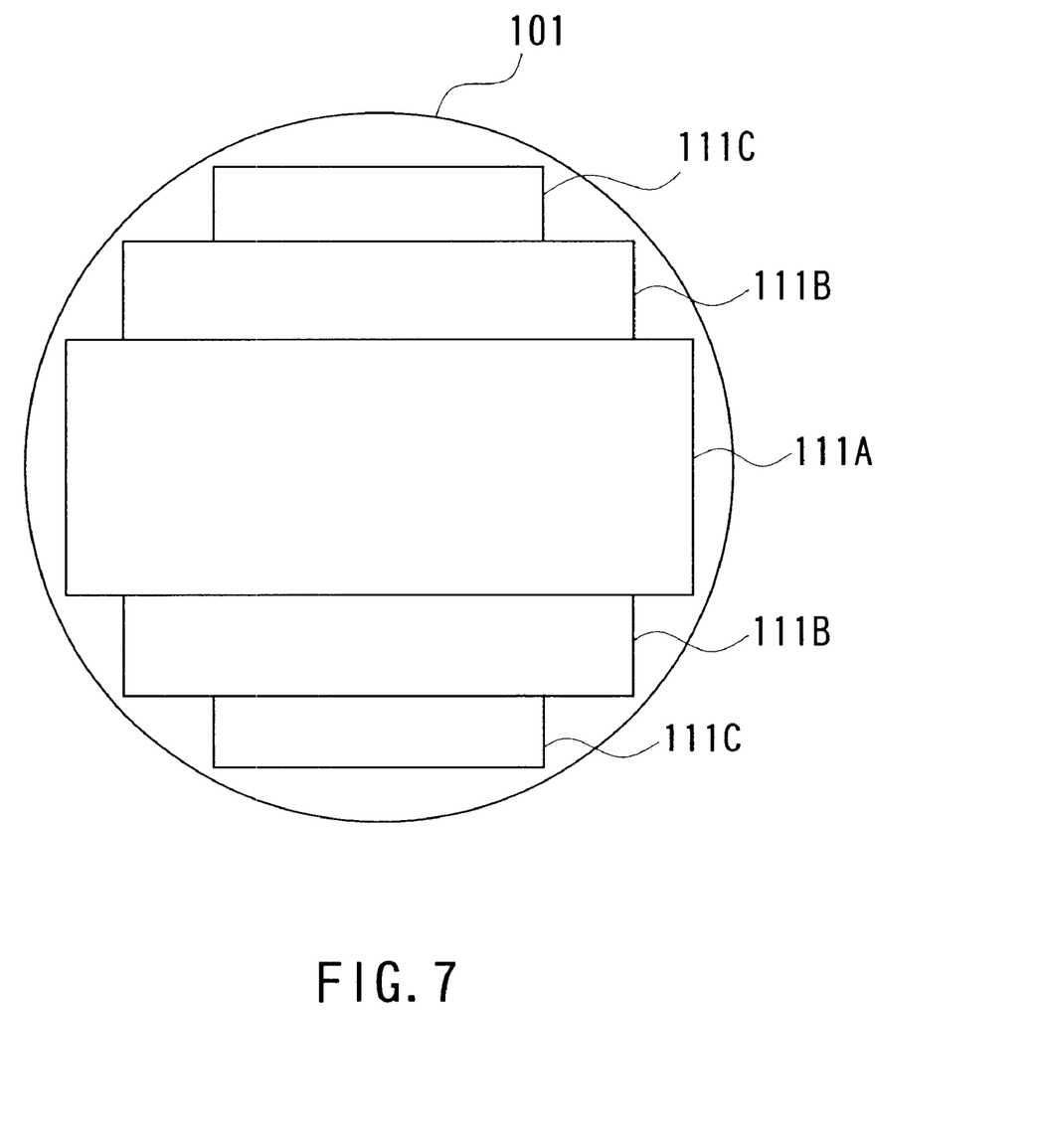
FIG. 7 is an explanatory view illustrating a step of manufacturing sliders of the embodiment of the invention.

In the first step, a plurality of types of blocks having different lengths are cut out of a circular-plate-shaped wafer including a plurality of rows of slider sections each of which includes a thin-film magnetic head element. FIG. 7 illustrates an example of a way in which these blocks are obtained. In this example three types of blocks 111A, 111B and 111C are obtained from the wafer 101. In FIG. 7 the rows of slider sections extend in the horizontal direction, and each of the rows is located on top or at the bottom of the adjacent one of the rows. The length of each of the blocks 111A, 111B and 111C is the dimension thereof measured in the horizontal direction of FIG. 7. Among the three types of blocks, the block 111A is the greatest, the block 111B is the second greatest, and the block 111C is the smallest in length. Each of the blocks 111A, 111B and 111C includes a plurality of rows of slider sections and has a specific length.

Figure 8:
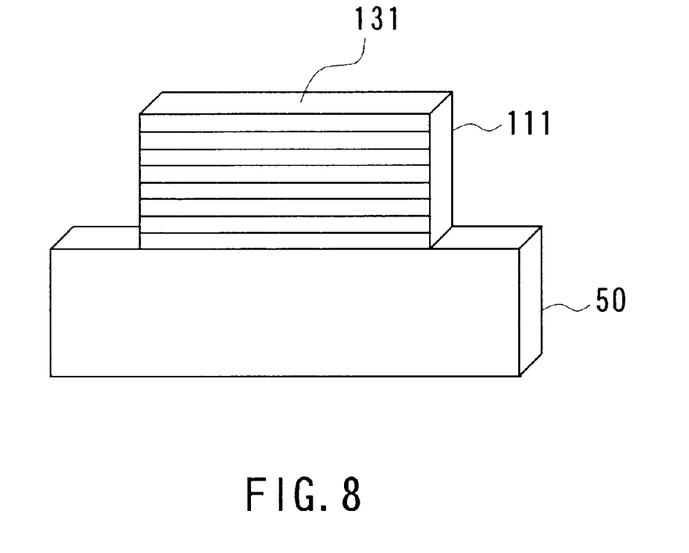
FIG. 8 is an explanatory view illustrating a step of manufacturing the sliders of the embodiment.

Next, a surface of the block 111 (that represents the blocks 111A, 111B and 111C) opposite to the medium facing surface is lapped. As shown in FIG. 8, the surface of the block 111 opposite to the medium facing surface 131 is then bonded to the jig 50 of this embodiment.

Figure 9:
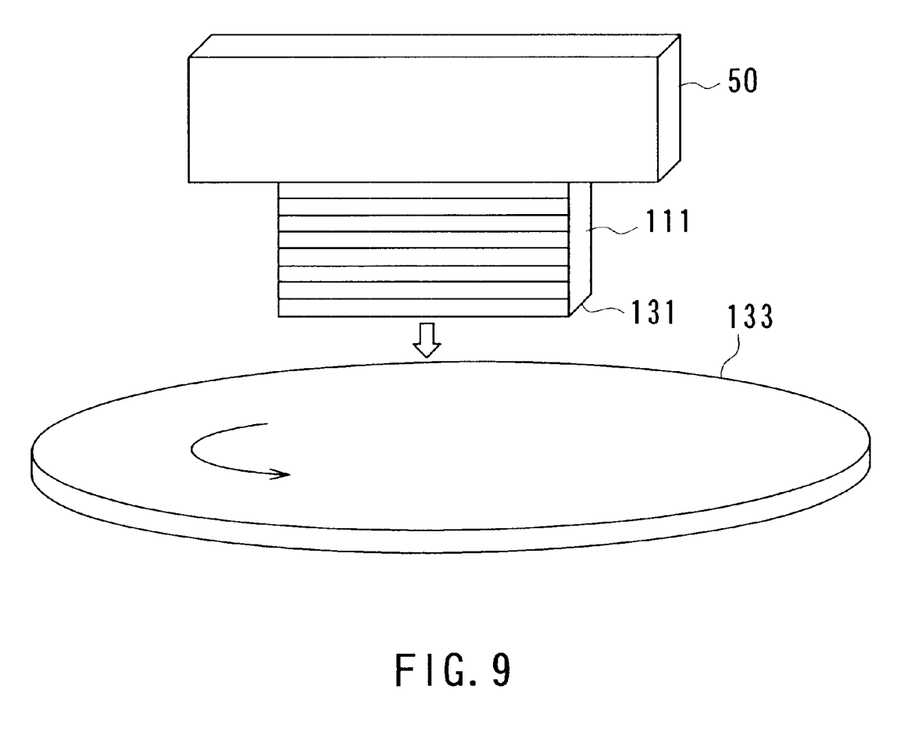
FIG. 9 is an explanatory view illustrating a step of manufacturing the sliders of the embodiment.

Next, as shown in FIG. 9, processing is performed on the medium facing surface 131 of the block 111 bonded to the jig 50. Such processing may be grinding using a grinding apparatus, or lapping using the processing apparatus as shown in FIG. 4, for example. The MR heights and the throat heights are thereby precisely defined.

Figure 10:
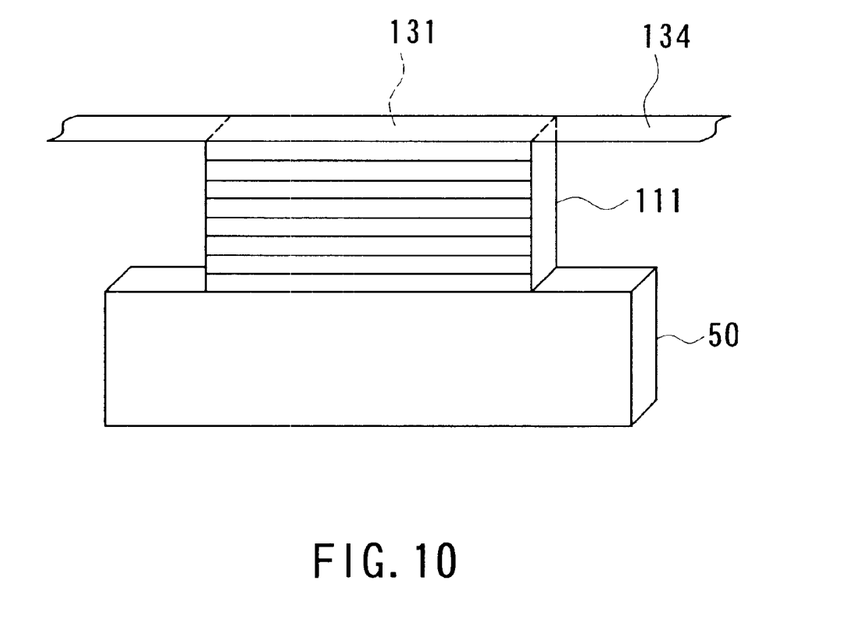
FIG. 10 is an explanatory view illustrating a step of manufacturing the sliders of the embodiment.

Next, as shown in FIG. 10, a strip-shaped protection material 134 is attached to the medium facing surface 131 so that the polished medium facing surface 131 is prevented from being damaged or eroded.

Figure 11:
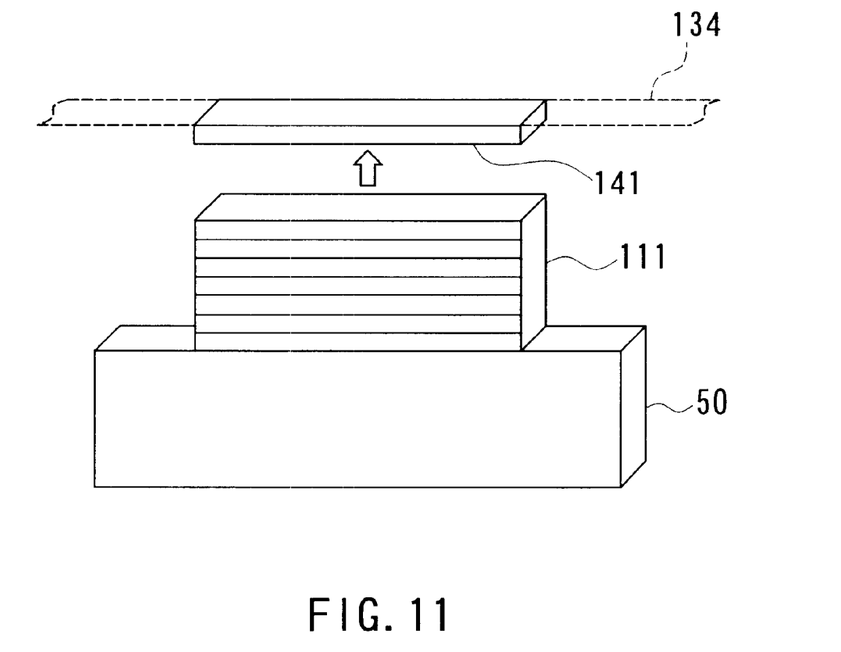
FIG. 11 is an explanatory view illustrating a step of manufacturing the sliders of the embodiment.

Next, as shown in FIG. 11, the block 111 is cut by a cutting apparatus while the medium facing surface 131 is covered with the protection material 134, such that a row of slider sections including the medium facing surface 131 is separated from the rest of the block 111. The row of slider sections thus separated from the block 111 is a bar 141 made up of the row of slider sections having received the processing. Processing of the medium facing surface and cutting are repeated as long as the block 111 remains.

Next, the protection material 134 is cut into pieces having appropriate lengths. Lapping is then performed on a surface of the bar 141 opposite to the medium facing surface thereof. Through this lapping, the final thickness of each slider and the profile of the medium facing surface are controlled.

Figure 12:
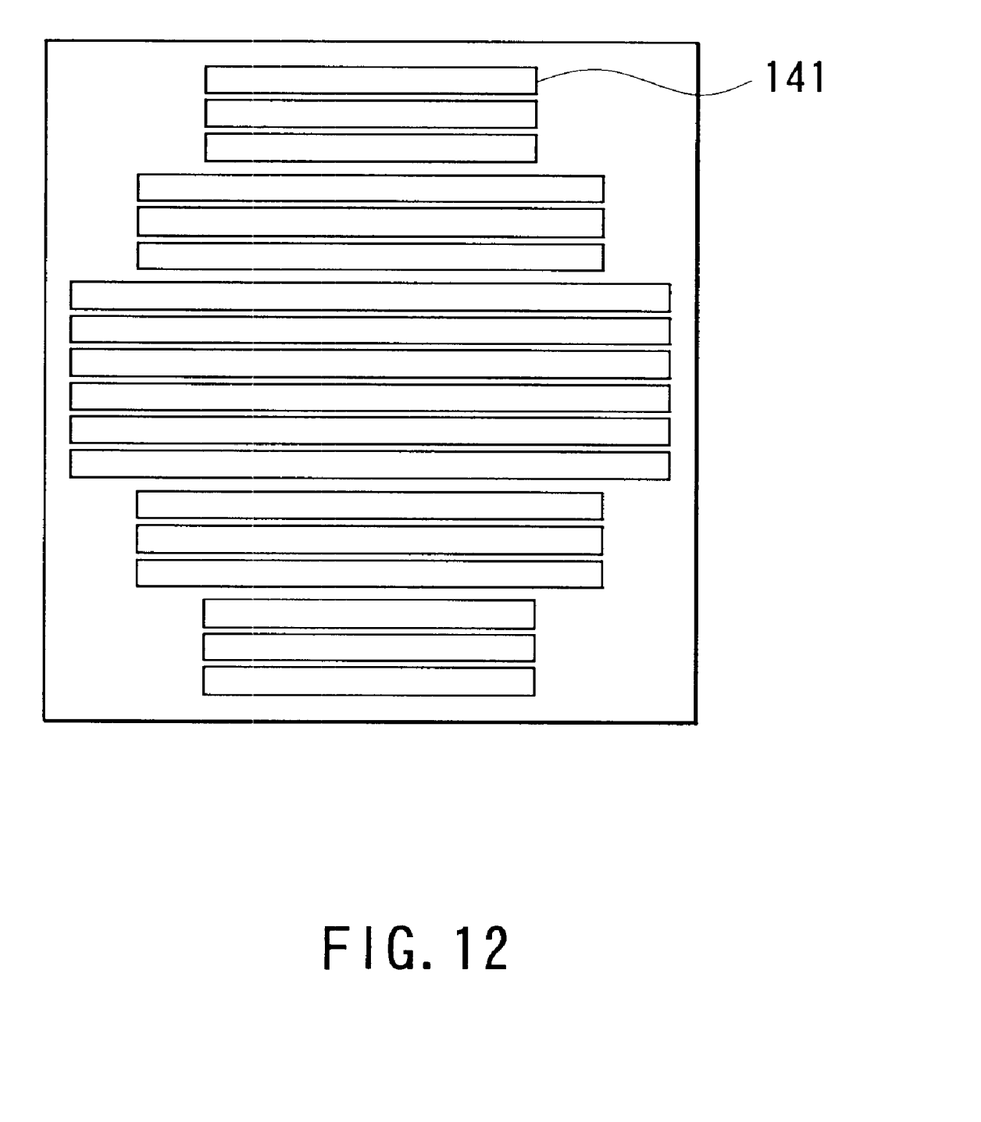
FIG. 12 is an explanatory view illustrating a step of manufacturing the sliders of the embodiment.

Next, as shown in FIG. 12, a plurality of bars 141 are aligned in rows. A photoresist pattern for etching is formed on the medium facing surfaces of the bars 141. Through the use of this photoresist pattern, the bars 141 are etched by dry etching. Rails are thereby formed in the medium facing surfaces of the bars 141.

Figure 13:
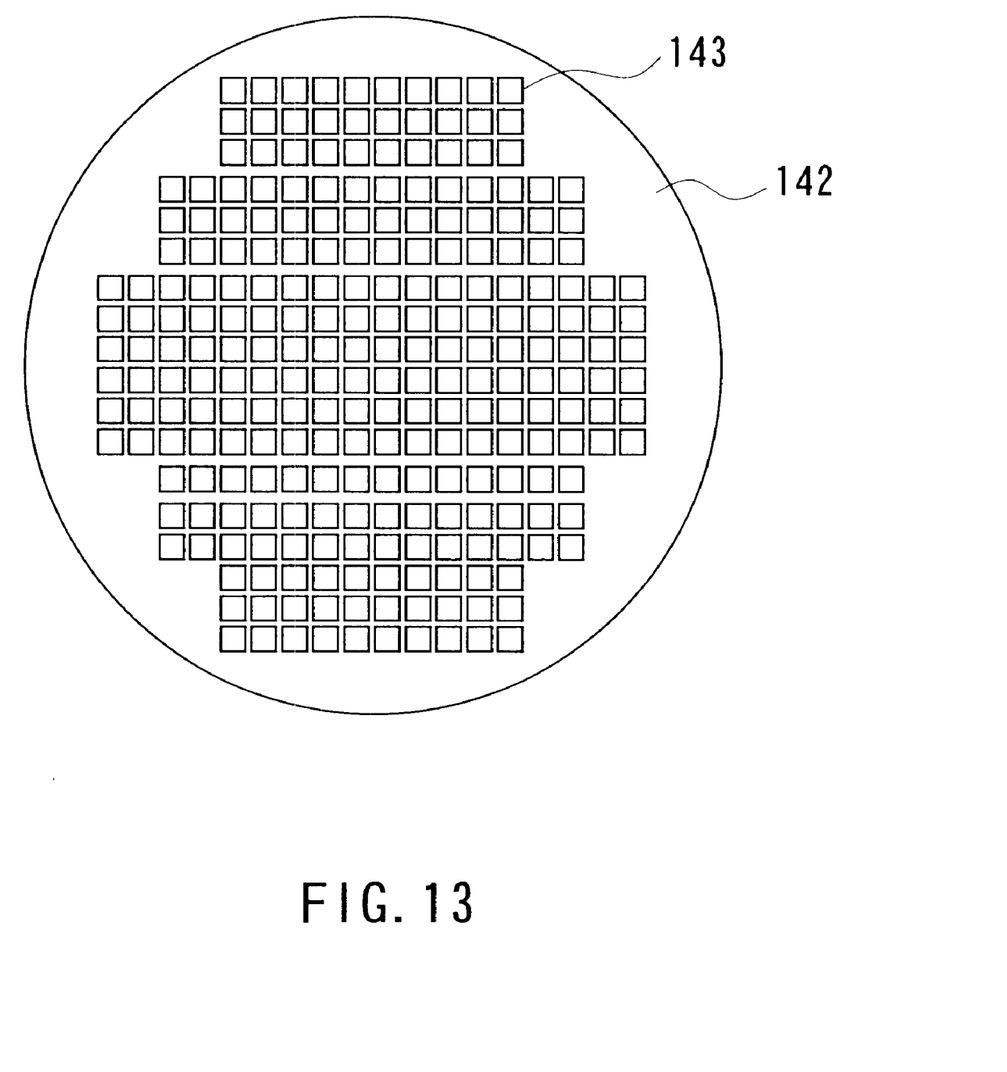
FIG. 13 is an explanatory view illustrating a step of manufacturing the sliders of the embodiment.

Next, as shown in FIG. 13, the bars 141 having the rails are aligned and IC tape 142 is attached thereto. The bars 141 are then cut by a cutting apparatus to obtain sliders 143.

According to the jig 50 of the embodiment described so far, the length of the retainer 52 includes: length L1 between the middle of the retainer 52 and the end load application section 54A or 54C; and length L2 between the middle of the retainer 52 and an end thereof. Length L2 is greater than length L1. As a result, the jig 50 allows the block 111 to be deformed into a desired shape if the block 111 has a length shorter than the distance between the two end load application sections 54A and 54C, or even if the block 111 has a length longer than this distance.

When the medium facing surface is processed through the use of the block 111, distortion of the medium facing surface is smaller, compared to the case in which the medium facing surface is processed through the use of a bar. Therefore, it is not necessary that the retainer 52 is capable of attaining deformation into a complicated shape when a plurality of types of blocks 111 having different heights are to be processed. Instead, the retainer 52 is preferably capable of attaining moderate deformation if necessary while basically maintaining the straightness. In the jig 50 of this embodiment length L2 between the middle of the retainer 52 and an end thereof is greater than length L1 between the middle of the retainer 52 and the end load application section 54A or 54C. It is thereby possible to moderately deform the retainer 52. Owing to such a configuration, the jig 50 of the embodiment is capable of allowing precise processing of a plurality of types of blocks 111 having different heights or lengths, or different heights and lengths.

In this embodiment the length of the retainer 52 includes length L3 between the middle of the retainer 52 and the middle coupler 53B or 53C. Length L3 is preferably greater than three sevenths of length L1 between the middle of the retainer 52 and the end load application section 54A or 54C. More preferably, length L3 is grater than a half of length L1. Such a configuration allows portions of the retainer 52 near the ends thereof to be deformed into desired shapes. It is thereby possible to more precisely process a plurality of types of blocks 111 having different lengths.

If length L3 between the middle of the retainer 52 and the middle coupler 53B or 53C is increased so that the jig 50 is applicable to several types of blocks 111 having different lengths as mentioned above, the stiffness of the portion between the middle of the length of the retainer 52 and each of the middle couplers 53B and 53C is reduced. When the height of the block 111 is low, in particular, unwanted deformation in this portion may result from reaction of the lapping plate, for example.

In the jig 50 of the embodiment of the invention, in contrast, the thickness of the portion of the retainer 52 between the middle of the length of the retainer 52 and each of the middle couplers 53B and 53C increases as the distance from the middle of the length of the retainer 52 or each of the middle couplers 53B and 53C increases. As a result, the stiffness of the portion of the retainer 52 between the middle of the length of the retainer 52 and each of the middle couplers 53B and 53C is enhanced. It is thereby possible to prevent unwanted deformation in this portion. It is thus possible to improve the precision of processing of a plurality of types of blocks 111 having different heights or lengths, or different heights and lengths.

According to the embodiment, as shown in FIG. 2, ends of several types of blocks 111 having different lengths are located at different points mainly in the portions between each of the ends of the length of the retainer 52 and each of the middle couplers 53B and 53C, depending on the lengths of the blocks 111. Therefore, in order to precisely process several types of blocks 111 having different lengths, it is not desirable that there are some portions easy to bend and some other portions hard to bend in the portions between each of the ends of the length of the retainer 52 and each of the middle couplers 53B and 53C. In the jig 50 of this embodiment each of these portions has a constant thickness. In addition, the thickness of these portions is greater than the thickness of each of the horizontal portions 53Ab and 53Db of the end couplers 53A and 53D. As a result, according to the embodiment, there are no particular portions easy to bend or portions hard to bend in the portions between each of the ends of the length of the retainer 52 and each of the middle couplers 53B and 53C. It is thereby possible to precisely process a plurality of types of blocks 111 having different lengths.

According to the embodiment, each of the end couplers 53A and 53D has each of the vertical portions 53Aa and 53Da, each of the horizontal portions 53Ab and 53Db, and each of the slanting portions 53Ac and 53Dc extending in a slanting direction and connecting the vertical portions 53Aa and 53Da to the horizontal portions 53Ab and 53Db, respectively. As a result, the end couplers 53A and 53D have no portions having acute angles. It is thereby possible to prevent stress from concentrating on portions having acute angles. According to the embodiment, each of the slanting portions 53Ac and 53Dc has a length sufficiently shorter than the length of each of the vertical portions 53Aa and 53Da and the horizontal portions 53Ab and 53Db. It is thereby possible to prevent the stiffness of the end couplers 53A and 53D from being too small.

According to the embodiment, each of the horizontal portions 53Ab and 53Db of the end couplers 53A and 53D has a thickness smaller than the thickness of the retainer 52. It is thereby possible to flexibly deform portions of the retainer 52 near the ends thereof, and to precisely process several types of blocks 111 having different lengths.

According to the embodiment, each of the arms 55A and 55C provided between the retainer 52 and each of the end load application sections 54A and 54C has the slit 59 extending from a position closer to the middle of the length of the retainer 52 toward a position closer to an end of the retainer 52. It is thereby possible to deform the retainer 52 including portions closer to the ends thereof into a desired shape.

If length d2 of the middle coupler 53B or 53C is much greater than thickness d1 of the portion of the retainer 52 corresponding to the middle coupler 53B or 53C, the displacement of the lower ends of the middle couplers 53B and 53C in the horizontal direction is increased, and the difference between the desired shape of the retainer 52 and the shape actually obtained is thereby increased. To prevent this, length d2 of the middle coupler 53B or 53C preferably falls within the range between 150% and 250% of thickness d1 of the portion of the retainer 52 corresponding to the middle coupler 53B or 53C.

When a plurality of types of blocks having different heights or lengths, or different heights and lengths are processed, the foregoing features of the jig 50 of the embodiment allow the precision in processing to be improved by 10 percent or greater, compared to the case in which a prior-art jig designed for processing bars having the same lengths is used.

Figure 14:
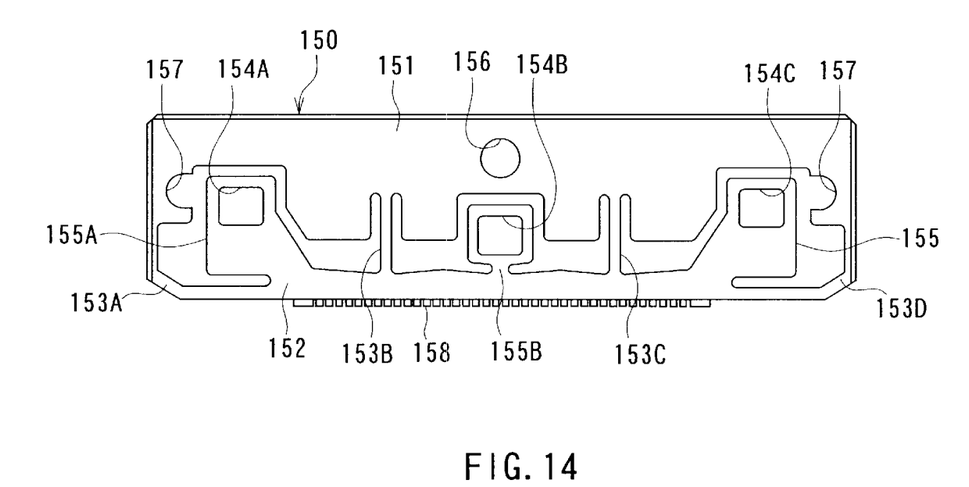
FIG. 14 is a front view of a jig of a reference example.

Finally, the result of comparison between the property of the jig 50 of the embodiment of the invention and the property of a jig designed for processing bars having the same lengths. FIG. 14 is a front view of the jig 150 of the reference example to be compared with the jig 50. The jig 150 comprises: a main body 151; a retainer 152 that is long in one direction for retaining a bar; four couplers 153A to 153D for coupling the retainer 152 to the main body 151; three load application sections 154A to 154C, coupled to the retainer 152, to which loads are applied for deforming the retainer 152; and arms 155A to 155C for coupling the retainer 152 to the load application sections 154A to 154C. The retainer 152 of the jig 150 has a length shorter than the length of the retainer 52 of the jig 50 of the embodiment of the invention. The length of a portion of the retainer 152 between the middle of the retainer 152 and an end thereof is shorter than the length between the middle of the retainer 152 and the load application sections 154A or 154C.

Figure 15:
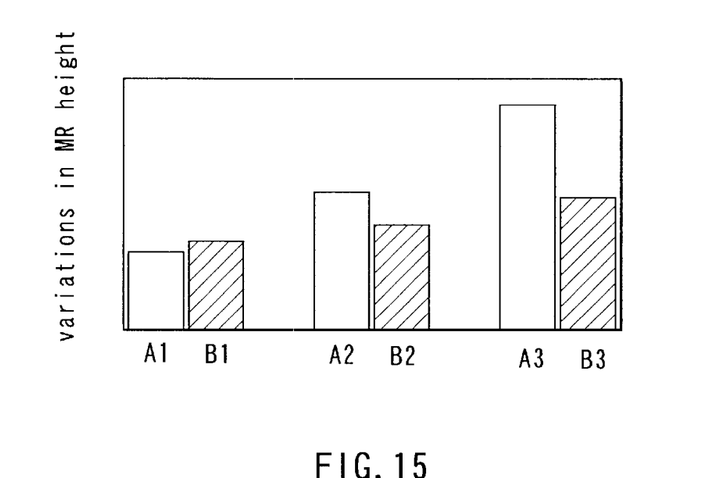
FIG. 15 illustrates the result of comparison made between the characteristic of the jig of the embodiment of the invention and the characteristic of the jig of the reference example.

FIG. 15 illustrates the result of comparison made between the jig 50 of the embodiment and the jig 150 of the reference example, with regard to variations in MR heights when the medium facing surfaces of three types of bars having different lengths were lapped while control was performed to obtain constant MR heights. In FIG. 15, A1 is the case in which a shorter bar was lapped with the jig 150. B1 is the case in which a shorter bar was lapped with the jig 50. A2 is the case in which a bar of middle-length was lapped with the jig 150. B2 is the case in which a bar of middle-length was lapped with the jig 50. A3 is the case in which a longer bar was lapped with the jig 150. B3 is the case in which a longer bar was lapped with the jig 50. The jig 150 had been designed for processing shorter bars.

As shown in FIG. 15, variations in MR heights increased as the bar length increased when the jig 150 of the reference example was used. In contrast, variations in MR heights were nearly constant when the jig 50 of the embodiment was used, regardless of the bar length, and the variations were smaller than the case in which the jig 150 was used.

The present invention is not limited to the foregoing embodiment but may be practiced in still other ways. For example, although the load application sections 54A to 54C receive loads in the three directions in the embodiment, it is possible that the load application sections 54A to 54C receive a load in the vertical direction only, or two directions, that is, the vertical direction and the other direction.

The invention may be applied to any other processing such as polishing and grinding besides lapping. The invention may be applied to processing of any object other than thin-film magnetic head elements.

According to the processing jig of the invention thus described, along the length of the retainer, the length of the retainer between the middle of the retainer and each of the ends thereof is greater than the length of the retainer between the middle of the retainer and each of the end load application sections. As a result, it is possible to precisely process each of a plurality of types of objects having different heights or lengths, or different heights and lengths.

According to the jig of the invention, along the length of the retainer, the length of the retainer between the middle of the retainer and each of the middle couplers may be greater than three sevenths of the length between the middle of the retainer and each of the end load application sections. It is thereby possible to more precisely process a plurality of types of objects having different lengths.

According to the jig of the invention, along the length of the retainer, the length between the middle of the retainer and each of the middle couplers may be greater than a half of the length between the middle of the retainer and each of the end load application sections. It is thereby possible to more precisely process a plurality of types of objects having different lengths.

According to the jig of the invention, the retainer may include the portions each of which is located between the middle of the length thereof and each of the middle couplers, each of these portions having a thickness increasing with increases in the distance from the middle of the length or each of the middle couplers. It is thereby possible to improve the precision of processing of a plurality of types of objects having different heights or lengths, or different heights and lengths.

According to the jig of the invention, the retainer may include the portions each of which is located between each of the ends thereof and each of the middle couplers, each of these portions having a constant thickness. It is thereby possible to more precisely process a plurality of types of objects having different lengths.

According to the jig of the invention, each of the end couplers may include: the vertical portion extending in the vertical direction and having an end connected to the main body; the horizontal portion extending in the horizontal direction and having an end connected to one of the ends of the retainer; and the slanting portion extending in a slanting direction and connecting the other end of the vertical portion to the other end of the horizontal portion. In this case, it is possible to prevent stress from concentrating on a specific portion.

According to the jig of the invention, the horizontal portion may have a thickness smaller than the thickness of the retainer. It is thereby possible to prevent the stiffness of the end couplers from being too small.

According to the jig of the invention, the slit may be provided between the retainer and each of the end load application sections, the slit extending from a position closer to the middle of the length of the retainer toward a position closer to one of the ends of the retainer. It is thereby possible to deform the retainer including portions near the ends thereof into a desired shape.

According to the jig of the invention, each of the middle couplers may have a length that falls within a range between 150% and 250% of a thickness of a portion of the retainer corresponding to each of the middle couplers. It is thereby possible to suppress deviation of the retainer from a desire shape.

Obviously many modifications and variations of the present invention are possible in the light of the above teachings. It is therefore to be understood that within the scope of the appended claims the invention may be practiced otherwise than as specifically described.

What is claimed is:

1. A processing jig for selectively retaining each of a plurality of types of objects to be processed that have different heights or lengths, or different heights and lengths, the jig being fixed to a processing apparatus for processing the objects, the jig comprising:

a main body to be fixed to the processing apparatus;

a retainer that is long in one direction for retaining each of the objects;

a middle load application section coupled to a portion of the retainer located in the middle of the length thereof, a load being applied to the section for deforming the retainer;

two end load application sections coupled to portions of the retainer near ends of the length thereof, a load being applied to each of the sections for deforming the retainer;

two middle couplers located between the middle load application section and each of the end load application sections, respectively, for coupling the main body to the retainer; and two end couplers for coupling the main body to the ends of the retainer; wherein, along the length of the retainer, a length between the middle of the retainer and each of the ends thereof is greater than a length between the middle of the retainer and each of the end load application sections.

2. The processing jig according to claim 1 wherein, along the length of the retainer, a length between the middle of the retainer and each of the middle couplers is greater than three sevenths of the length between the middle of the retainer and each of the end load application sections.

3. The processing jig according to claim 1 wherein, along the length of the retainer, the length between the middle of the retainer and each of the middle couplers is greater than a half of the length between the middle of the retainer and each of the end load application sections.

4. The processing jig according to claim 1 wherein the retainer includes portions each of which is located between the middle of the length thereof and each of the middle couplers, each of these portions having a thickness increasing with increases in the distance from the middle of the length or each of the middle couplers.

5. The processing jig according to claim 1 wherein the retainer includes portions each of which is located between each of the ends thereof and each of the middle couplers, each of these portions having a constant thickness.

6. The processing jig according to claim 1 wherein each of the end couplers includes: a vertical portion extending in the vertical direction and having an end connected to the main body; a horizontal portion extending in the horizontal direction and having an end connected to one of the ends of the retainer; and a slanting portion extending in a slanting direction and connecting the other end of the vertical portion to the other end of the horizontal portion.

7. The processing jig according to claim 6 wherein the horizontal portion has a thickness smaller than a thickness of the retainer.

8. The processing jig according to claim 1 wherein a slit is provided between the retainer and each of the end load application sections, the slit extending from a position closer to the middle of the length of the retainer toward a position closer to each of the ends of the retainer.

9. The processing jig according to claim 1 wherein each of the middle couplers has a length that falls within a range between 150% and 250% of a thickness of a portion of the retainer corresponding to each of the middle couplers.

10. The processing jig according to claim 1 wherein each of the objects is a thin-film magnetic head material made up of at least one row of sections to be sliders each of which includes a thin-film magnetic head element.

* * * * *